Figure 1:
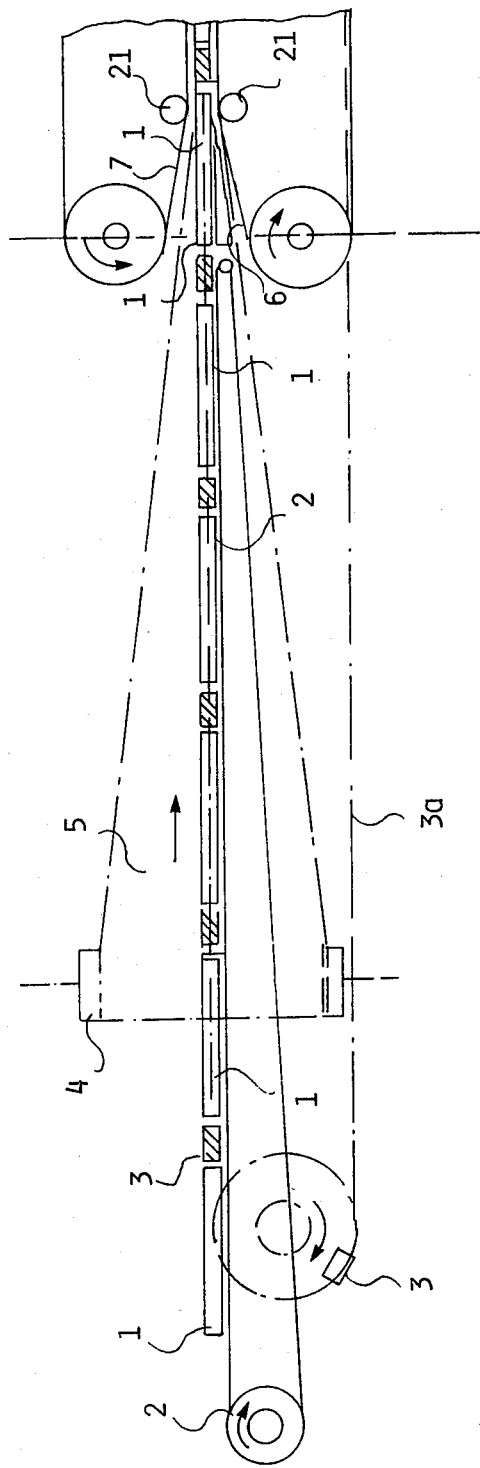

United States Patent [19]

Lesch

[11] Patent Number: 4,624,100
[45] Date of Patent: Nov. 25, 1986

[54] DEVICE FOR CONTINUOUSLY FEEDING (SYNCHRONIZING) ESSENTIALLY FLAT ARTICLES OF THE LUXURY-FOOD OR FOOD INDUSTRY, ESPECIALLY BARS OR STRIPS OF CHOCOLATE, TO A PACKAGING MACHINE

[75] Inventor: Hans Lesch, Garmisch-Partenkirchen, Fed. Rep. of Germany

[73] Assignee: Otto Hänsel GmbH, Hanover, Fed. Rep. of Germany

[21] Appl. No.: 767,263

[22] PCT Filed: Dec. 21, 1984

[86] PCT No.: PCT/EP84/00425
§ 371 Date: Aug. 12, 1985
§ 102(e) Date: Aug. 12, 1985

[87] PCT Pub. No.: WO85/03054
PCT Pub. Date: Jul. 18, 1985

[30] Foreign Application Priority Data

Jan. 4, 1984 [DE] Fed. Rep. of Germany ....... 3400172

[51] Int. Cl.⁴ ............................................. B65B 35/24
[52] U.S. Cl. ........................................ 53/550; 53/252
[58] Field of Search ................. 53/550, 450, 548, 209, 53/203, 228, 252

[56] References Cited

U.S. PATENT DOCUMENTS 2,605,597 8/1952 Scheib ............................ 53/378 X
3,283,470 11/1966 Oelze et al. ........................ 53/397
3,900,096 8/1975 Nack et al. ..................... 414/75 X

FOREIGN PATENT DOCUMENTS

WO84/00735 3/1984 PCT Int'l Appl.
547733 4/1974 Switzerland.
2033327 5/1980 United Kingdom.

Primary Examiner—James F. Coan
Attorney, Agent, or Firm—Max Fogiel

[57] ABSTRACT

A device for continuously feeding (synchronizing) essentially flat articles of the luxury-food or food industry, especially bars or strips of chocolate, to a packaging machine, in which carriers in a transport assembly introduce the articles into a tube of wrapping material and shape them into individual packages with it, characterized in that an infeed (25) for the articles (1) that operates transversely with respect to and is synchronized with a transport mechanism (3a) that operates at a constant speed and is equipped with carriers (3) is positioned upstream of the transport mechanism and in that buffers (30) for the articles arriving on the infeed are positioned between the carriers and controlled in such a way that the articles will enter the tube (5) of wrapping material in sequence and in a direction derived from the infeed and transport directions.

9 Claims, 6 Drawing Figures

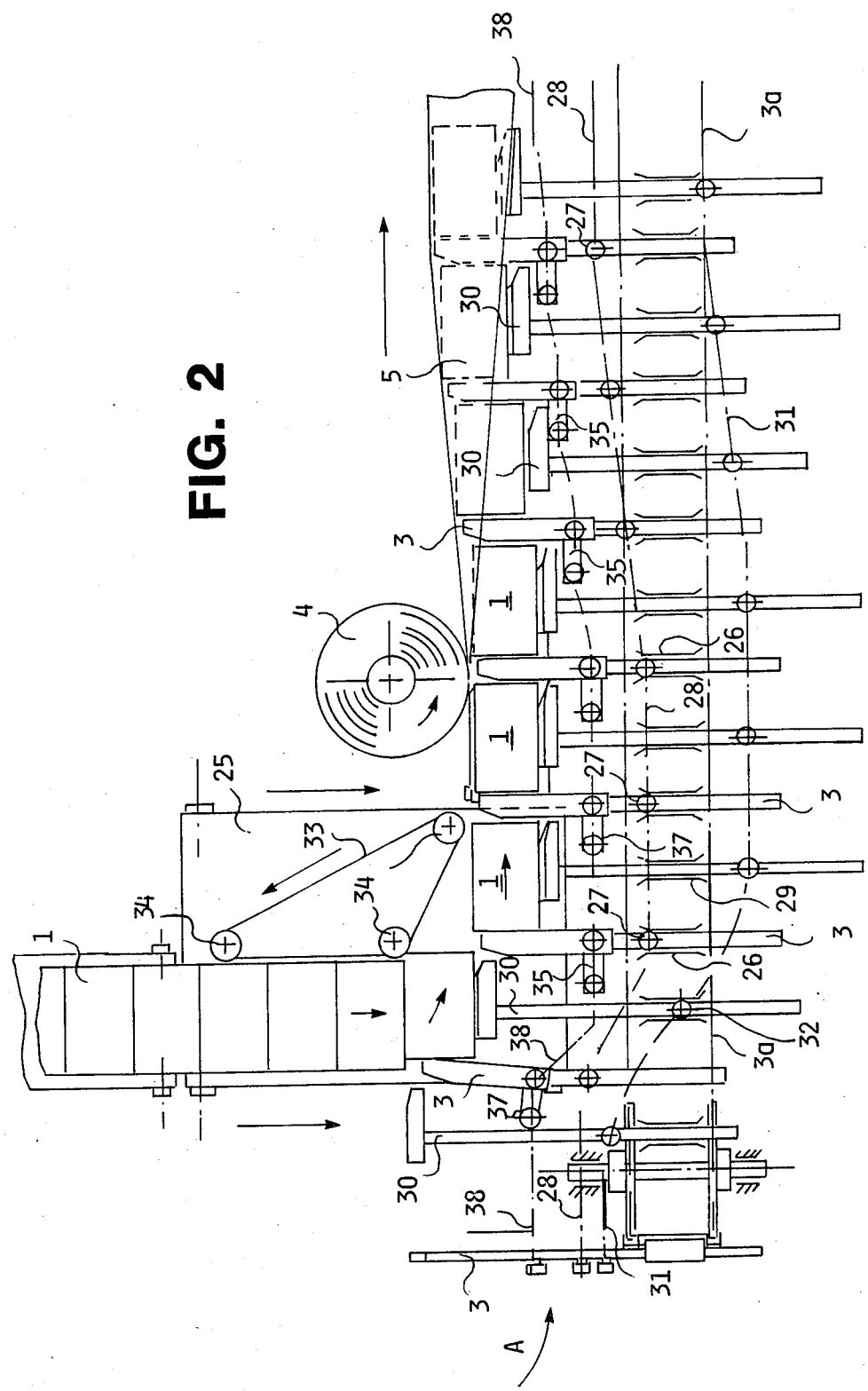

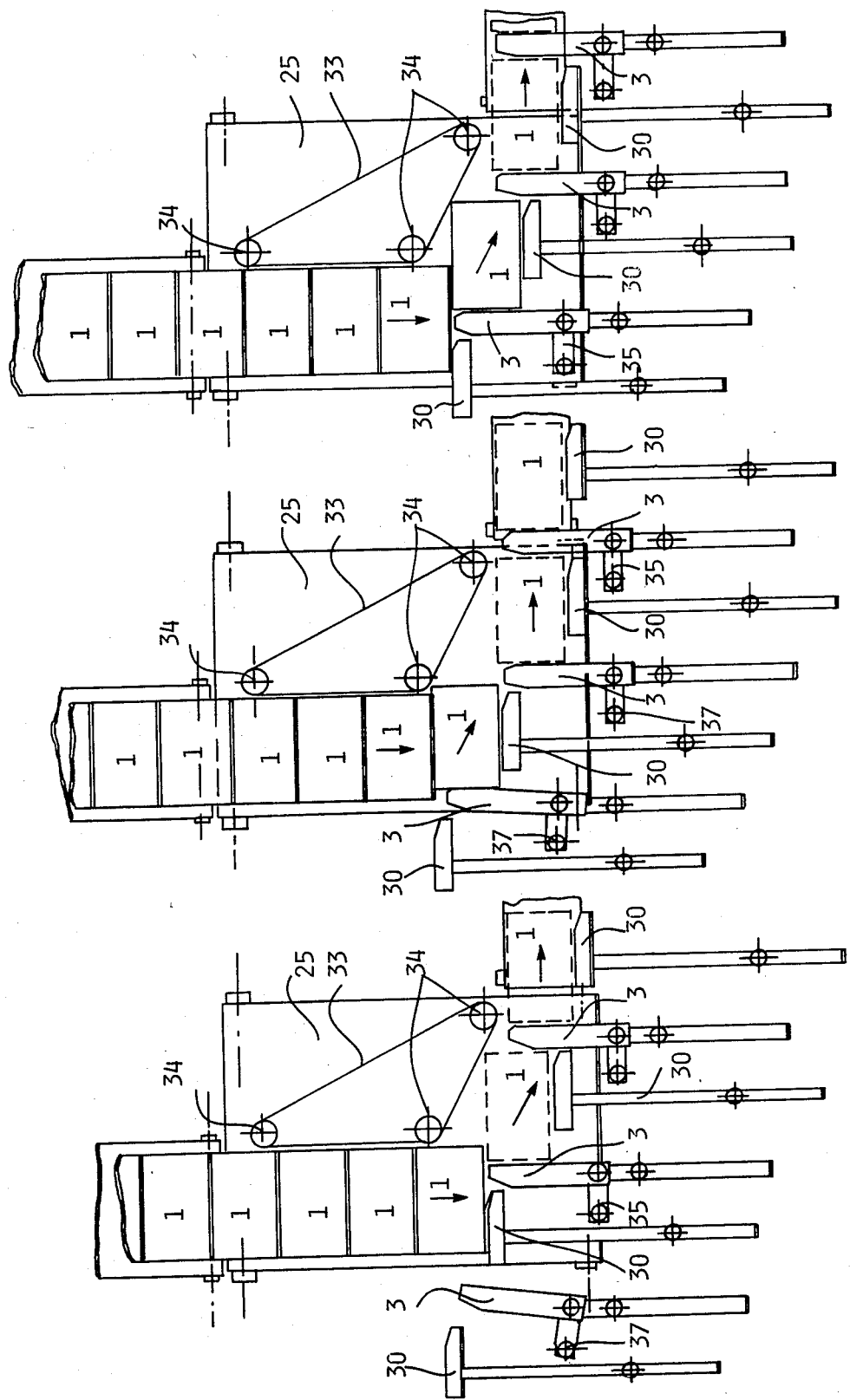

DEVICE FOR CONTINUOUSLY FEEDING (SYNCHRONIZING) ESSENTIALLY FLAT ARTICLES OF THE LUXURY-FOOD OR FOOD INDUSTRY, ESPECIALLY BARS OR STRIPS OF CHOCOLATE, TO A PACKAGING MACHINE

The invention concerns a device for continuously feeding (synchronizing) essentially flat articles of the luxury-food or food industry, especially bars or strips of chocolate, to a packaging machine, in which carriers in a transport assembly introduce the articles into a tube of wrapping material and shape them into individual packages with it.

Only a certain packaging output can be achieved with packaging machines of this type, which are known from U.S. Pat. No. 3,283,470 because it is difficult to feed the articles in. Since the tube of packaging material cannot be completely closed, tightly sealed packages cannot be produced. Furthermore, they can be employed only to package solid articles because they are subjected to excessive stress when transported through the machine.

The object of the present invention is to eliminate this defect and provide a device that allows thorough closure of even the most delicate articles in a wrapping that is tightly sealed on all sides at a high packaging output and without noticeable mechanical stress.

This object is attained in accordance with the invention in that an infeed for the articles that operates transversely with respect to and is synchronized with a transport mechanism that operates at a constant speed and is equipped with carriers is positioned upstream of the transport mechanism and in that buffers for the articles arriving on the infeed are positioned between the carriers and controlled in such a way that the articles will enter the tube of wrapping material in sequence and in a direction derived from the infeed and transport directions. A mechanism to control the buffers and carriers is provided in order to take out each frontmost article arriving from the infeed by means of its associated buffer without interference from the subsequent article as the carriers move transversely.

Preferably, closure mechanisms are provided that are in themselves known and that fasten the longitudinal edges of the tube of packaging material together by welding or cementing once the carriers have been removed, the infeed is positioned upstream of the tube shaper, and the carriers can be moved all the way into the operating range of the infeed in a direction opposite that of the transport mechanism that they are mounted on and transversely with respect to its direction of conveyance by means of a control mechanism, can initially be retracted along with the picked-up article into the entry range of the tube shaper, and, once the tube has been shaped, can be removed from it before it is sealed.

Preferably, the carriers are positioned in such a way that they can be moved in guides transversely over the transport mechanism that the carriers are mounted and connected to a control mechanism that activates them. The mechanism that controls the carriers and the buffers consists of a curve guide, a grooved curve for example, that extends all the way along the transport mechanism and of guide rollers bordering them and resting on the shaft of the carriers.

To ensure reliable loading of the machine without malfunction, the buffers are positioned between the carriers on the transport mechanism that the carriers are mounted on in such a way that the buffers can be moved, their heads supporting one side of the articles arriving in the infeed before the side of the frontmost article is picked up by its associated carrier. A curved guide that extends along the direction of conveyance and within which the buffers are guided by appropriate guide rollers is provided to control the buffers. Finally, a lead device is provided at the side of the infeed to further guide the articles toward the tube of wrapping material.

Figure 6:
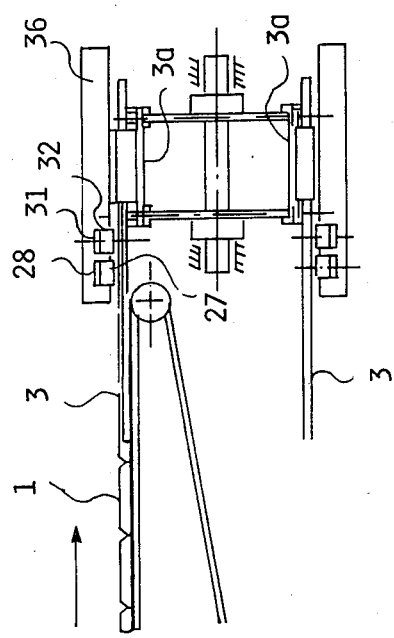

The theory behind the invention allows an extremely wide range of potential embodiments, one of which is illustrated in the drawings, in which FIG. 1 is a schematic front view of the intake section of a packaging machine, FIG. 2 is a top view of the section of a packaging machine illustrated in FIG. 1, FIGS. 3 through 5 are details of FIG. 2 illustrating various operating positions of the carriers, and FIG. 6 is a view along the direction indicated by arrow A in FIG. 2.

The articles to be packaged are in the present case for example rectangular chocolate bars 1 that as illustrated in FIG. 1 are supplied on a conveyor belt 2 to a tube shaper. The conveyance of articles 1 on belt 2 is assisted with carriers 3, which lie one after another on a transport mechanism 3a positioned alongside supply belt 2. The function and operation will be explained later herein. The wrapping material, a packaging foil 5 like a strip of hot-sealing aluminum foil for example, is taken from a supply roll 4 that rotates around a vertical axis and wrapped around the stream of chocolate bars in a U shape from the side.

A tube of wrapping material with a U-shaped cross-section and open on one side is constructed and chocolate bars 1 enter it lengthwise. Finally, wrapping-material tube 5 with articles 1 contained in it travels between a pair 6 and 7 of conveyor belts that run over guide rollers 21. The further design and operation of the packaging machine are the object of a prior Application P No. 32 30 083.2-27 and need no further description herein. What is important is that the tube of wrapping material is not sealed, by welding or cementing, along it longitudinal edges until after the articles have been introduced into it, upon which the now sealed tube is welded and divided between the sequence of articles.

The device in accordance with the invention is illustrated in FIGS. 2 through 6. Upstream of tube shaper 4 and 5 is an infeed 25 in the form of a flat belt, which, as illustrated in FIG. 2, circulates in the direction indicated by the arrow, transversely with respect to conveyor belt 2. Articles 1 are supplied on the infeed belt along the direction indicated by the arrow and transversely with respect to the direction of conveyance of belt 3a between the carriers 3 resting thereon. For this purpose carriers 3 are retained in such a way that they can move in guides 26 on conveyance mechanism 3a transversely with respect to the direction that the belt is moving in. The transverse movement is produced in that carriers 3 move along with a guide roller 27 in a guide path like the grooved curve 28 or similar structure illustrated by the dot-and-dash lines in FIG. 2. Other guides 29 are provided on transport mechanism 3a between carriers 3, and buffers 30 with their shafts also extending transversely with respect to the direction of conveyance travel in guides 29 as well as along a curved guide 31 with guide rollers 32 (cf. FIG. 6).

Guide paths 28 and 31 extend all the way along transport mechanism 3a and are designed to move carriers 3 far enough out just upstream of infeed 25 to always pick up the frontmost article arriving in infeed 25 as transport mechanism 3a advances and carry it to the side as illustrated in FIG. 2. Buffers 30 on the other hand are controlled in such a way that they will rest against one side of articles 1 as the articles are released from infeed 25 between carriers 3 and will retain the articles while they are being transferred into the tube shaper and orient them in such a way that they will enter foil tube 5 in an orderly manner, relieved of any backup pressure from the other articles.

The various steps in the procedure of sequentially transferring the articles from infeed 25 between the carriers 3 on transport mechanism 3a will be evident from FIGS. 3 through 5. Another, laterally situated, guide belt 33 that travels over three pulleys 34 (FIG. 2) can be employed if necessary to secure and guide the articles from the other side as well.

To relieve the articles from the backup pressure of the articles following them on infeed 25, the tops of carriers 3 are articulated together at their associated shafts and provided with a lateral projection 35 that travels with a guide roller 37 along a curve guide 38 and is accordingly guided by it. The overall motion of the carriers and buffers is governed by curve guides 28, 31, and 38. These guides can be grooved guides engaged by guide rollers 27 or 32 (FIG. 6). The grooved guides can be provided in a cover plate 36 extending along and over transport mechanism 3a.

It is also important for carriers 3 to be guided by grooved curve 28 in such a way that they will be retracted from the wrapping-material tube at just the right time before it is closed in order to arrive back in their initial position upstream of infeed 25 and pick up a new article 1.

The invention is naturally not restricted to the packaging of chocolate bars or strips, but can be employed as described to continuously produce tightly sealed packages from a tube of wrapping material for a wide range of articles.

I claim:

1. Apparatus for continuously feeding synchronously substantially flat articles, particularly, bars or strips of chocolate, to a packaging machine, comprising: transport means operating at constant speed and having carriers for introducing the articles into a tube of wrapping material and shaping the articles into individual packages; infeed means for the articles and operating transversely with respect to said transport means, said infeed operating synchronously with said transport means; said infeed means being positioned upstream of said transport means; buffers for the articles arriving on said infeed means and positioned between said carriers, said buffers being controlled so that the articles will enter said tube of wrapping material in sequence and in a direction derived from infeed and transport directions; said buffers being separated from said carriers, said buffers and carriers having motions controlled independently of one another for inserting the articles into said tubes of wrapping material; said articles being moved away to a side from their initial transport direction and subsequently said articles being moved by a substantially small amount opposite to the initial transport direction, said articles being thereafter transported along a curved path.

2. Apparatus as defined in claim 1, including means for controlling said buffers and said carriers so that each frontmost article arriving from said infeed means by a respective buffer without interference from a subsequent article as said carriers move transversely.

3. Apparatus as defined in claim 1, including closure means for fastening longitudinal edges of said tube of wrapping material together after said carriers have been removed; a tube shaper, said infeed means being positioned upstream of said tube shaper; control means for moving said carriers into operating range of said infeed means in a direction opposite to the direction of said transport means and transversely with respect to direction of transport, said infeed means being initially retracted along with a picked-up article into entry range of said tube shaper, said infeed means being removable after said tube has been shaped and before said tube is sealed.

4. Apparatus as defined in claim 3, including guides, said carriers being positioned so that they can be moved in said guides transversely over said transport means, said carrier being mounted and connected to said control means.

5. Apparatus as defined in claim 4, wherein said control means for controlling said carriers and said buffers comprises a curved guide extending along said transport means; and guide rollers bordering said buffers and resting on a shaft of said carriers.

6. Apparatus as defined in claim 1, wherein said buffers are positioned on said transport means, said carriers being mounted so that said buffers are movable transversely, said buffers having heads supporting one side of the articles arriving in said infeed means before a side of the frontmost article is picked up by its respective carrier.

7. Apparatus as defined in claim 6, including a curved guide extending along direction of transport, said buffers being guided within said curved guide, and guide rollers for controlling said buffers.

8. Apparatus as defined in claim 1, including lead means at a side of said infeed means for guiding further said articles toward said tube of wrapping material.

9. Apparatus for continuously feeding synchronously substantially flat articles, particularly, bars or strips of chocolate, to a packaging machine, comprising: transport means operating at constant speed and having carriers for introducing the articles into a tube of wrapping material and shaping the articles into individual packages; infeed means for the articles and operating transversely with respect to said transport means, said infeed operating synchronously with said transport means; said infeed means being positioned upstream of said transport means; buffers for the articles arriving on said infeed means and positioned between said carriers, said buffers being controlled so that the articles will enter said tube of wrapping material in sequence and in a direction derived from infeed and transport directions; and buffers being separated from said carriers, said buffers and carriers having motions controlled independently of one another for inserting the articles into said tubes of wrapping material; said articles being moved away to a side from their initial transport direction and subsequently said articles being moved by a substantially small amount opposite to the initial transport direction, said articles being thereafter transported along a curved path; means for controlling said buffers and said carriers so that each frontmost article arriving from said infeed means by a respective buffer without interference from a subsequent article as said carriers move transversely; closure means for fastening longitudinal edges of said tube of wrapping material together after said carriers have been removed; a tube shaper, said infeed means being positioned upstream of said tube shaper; control means for moving said carriers into operating range of said infeed means in a direction opposite to the direction of said transport means and transversely with respect to direction of transport, said infeed means being initially retracted along with a picked-up article into entry range of said tube shaper, said infeed means being removable after said tube has been shaped and before said tube is sealed; guides, said carriers being positioned so that they can be moved in said guides transversely over said transport means, said carrier being mounted and connected to said control means; said control means for controlling said carriers and said buffers comprises a curved guide extending along said transport means; and guide rollers bordering said buffers and resting on a shaft of said carriers; said buffers are positioned on said transport means, said carriers being mounted so that said buffers are movable transversely, said buffers having heads supporting one side of the articles arriving in said infeed means before a side of the frontmost article is picked up by its respective carrier; a curved guide extending along direction of transport, said buffers being guided within said curved guide, and guide rollers for controlling said buffers; lead means at a side of said infeed means for guiding further said articles toward said tube of wrapping material.

* * * * *